United States Patent [19]

Braatz et al.

[11] 4,191,454

[45] Mar. 4, 1980

[54] CONTINUOUS SILICON MOS AC LIGHT VALVE SUBSTRATE

[75] Inventors: Paul O. Braatz; Jan Grinberg, both of Los Angeles; Alexander D. Jacobson, Topanga; Michael Waldner, Woodland Hills, all of Calif.

[73] Assignee: Hughes Aircraft Company, Culver City, Calif.

[21] Appl. No.: 949,840

[22] Filed: Oct. 10, 1978

Related U.S. Application Data

[63] Continuation of Ser. No. 808,224, Jun. 20, 1977, abandoned.

[51] Int. Cl.$^2$ .............................................. G02F 1/13
[52] U.S. Cl. .................................... 350/342; 350/332; 357/30
[58] Field of Search .................. 350/332, 334, 342; 357/24, 30

[56] References Cited

U.S. PATENT DOCUMENTS

| | | | |
|---|---|---|---|
| 3,976,361 | 8/1976 | Fraas et al. | 350/342 |
| 4,032,954 | 6/1977 | Grinberg et al. | 350/342 X |
| 4,093,357 | 6/1978 | Jacobson et al. | 350/342 X |

*Primary Examiner*—Edward S. Bauer
*Attorney, Agent, or Firm*—George Tacticos; W. H. MacAllister

[57] ABSTRACT

There is disclosed a single crystal silicon charge storage apparatus suitable for use in an alternating current driven liquid crystal light valve. The charge storage medium is made of a high resistivity and photosensitive under AC excitation substrate on which an MOS capacitor is formed having fast photoelectric transient response and capable of operating over a wide frequency range. The AC activation provides to a liquid crystal light valve a greatly improved electrochemical stability. Electrically coupled high-reflectivity mirrors and light blocking layers can be used to couple the liquid crystal to the MOS capacitor.

5 Claims, 5 Drawing Figures

Fig. 2
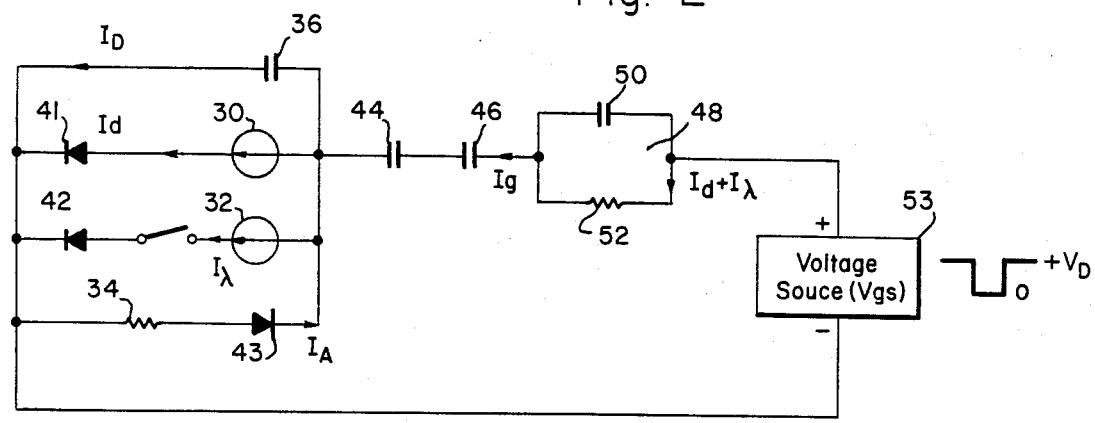
Fig. 3a.
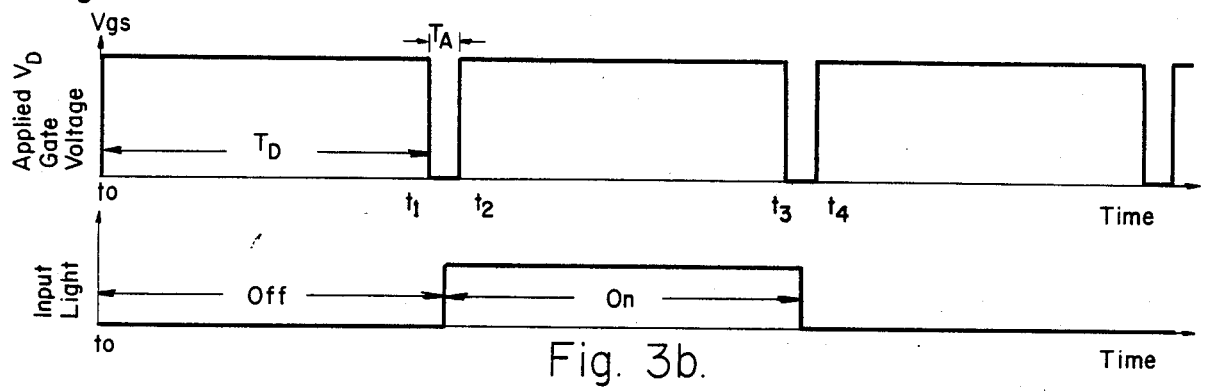
Fig. 3b.
Fig. 3c.
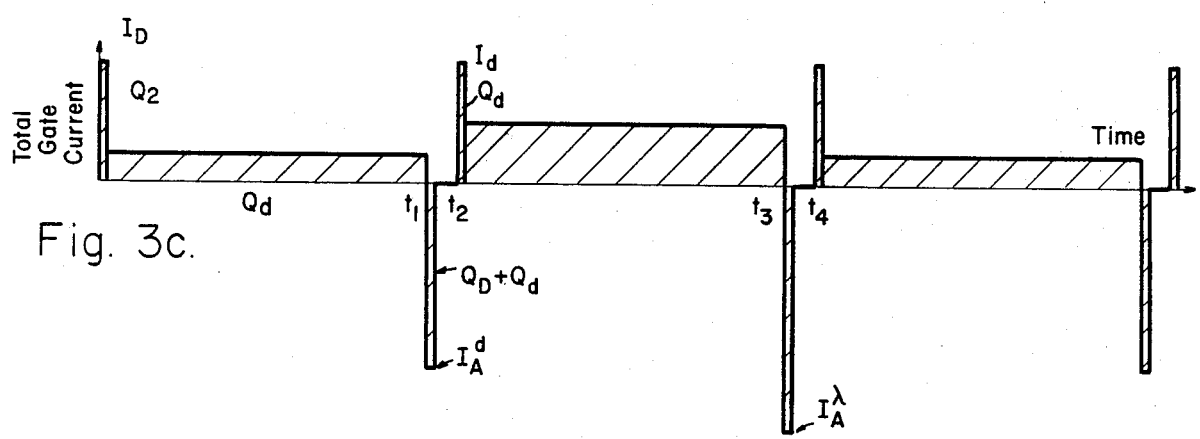
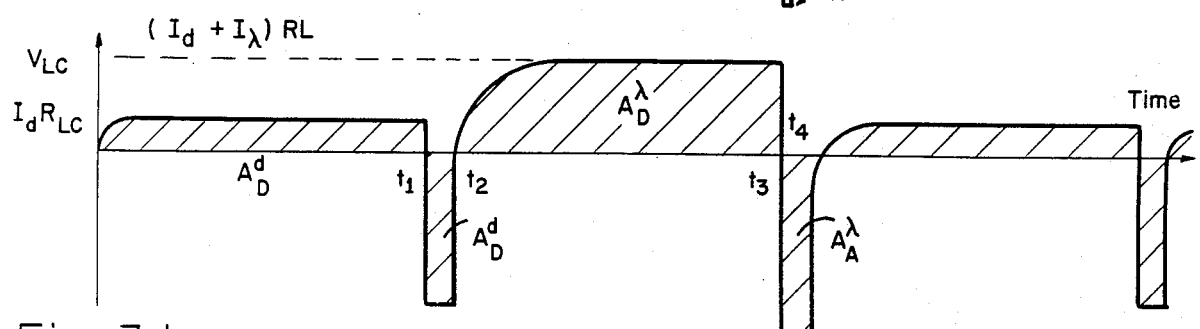
Fig. 3d.

CONTINUOUS SILICON MOS AC LIGHT VALVE SUBSTRATE

This is a continuation of application Ser. No. 808,224, filed June 20, 1977, now abandoned.

FIELD OF THE INVENTION

This invention relates to a charge storage and transfer apparatus and more particularly to an MOS capacitor-type structure for the storage and transfer of photogenerated minority carriers representing signals to an alternating current driven liquid crystal light valve.

RELATED APPLICATIONS

In a copending U.S. patent application Ser. No. 4,107 filed on Jan. 17, 1979, as a continuation of abandoned U.S. patent application Ser. No. 792,842 filed on May 2, 1977, entitled "High Resolution Continuously Distributed Silicon Photodiode Substrate" by Grinberg et al and assigned to the present assignee, there is disclosed and generically claimed a semiconductor apparatus for the transfer of charge from one surface of a substrate to the opposite through the use of a space charge depletion region.

In another copending U.S. patent application Ser. No. 5,418 filed on Jan. 22, 1979, as a continuation of abandoned U.S. patent application Ser. No.796,641 filed on May 13, 1977, there is disclosed and generically claimed a semiconductor apparatus for the transfer of charge from one surface of a substrate to the opposite through the use of a charge depletion region wherein the charge packets are initially stored under a set of CCD electrodes overlying an epitaxial layer formed on a surface of the substrate and then they are simultaneously transferred across the entire thickness of the substrate.

BACKGROUND OF THE INVENTION

U.S. Pat. No. 3,824,002 issued to Terry D. Beard entitled "Alternating Current Liquid Crystal Light Valve" and assigned to the present assignee discloses the basic principles of operation of an alternating current liquid crystal light valve which requires that a photoconductor be impedance-matched to the liquid crystal, the photocapacitance of the photoconductor being modulated in response to an input light.

U.S. Pat. No. 3,976,361 issued to Fraas et al entitled "Charge Storage Diode with Graded Defect Density Photocapacitive Layer" and assigned to the present assignee discloses a different photoconductor for a similar light valve. The photoconductor consists of a charge storage semiconductor diode with a graded band gap layer increasing the optical absorption coefficient of the region near the rectifying junction to permit the storage of charge.

U.S. Pat. No. 4,032,954 issued to, Grinberg et al entitled "Silicon Single Crystal Charge Storage Diode" and assigned to the present assignee describes a species of the generic invention of U.S. Pat. No. 3,976,361. It discloses a charge storage photodiode silicon substrate which is doped with a slow recombination center element, such as silver, to combine the advantages of a highly developed silicon manufacturing technology with a high liquid crystal stability under AC operating conditions.

The aforementioned copending U.S. patent application Ser. No. 792,842 filed on May 2, 1977, discloses the use of a space charge depletion region to transfer field guided minority charge carriers representing signals from one surface of a substrate to the opposite using the depletion region as a transfer medium. The charges are DC drive and the depletion region in one embodiment is formed by reverse biasing a rectifying junction. As it was indicated in that application, minority carriers representing signals can be generated or injected into the storage and transfer medium through a variety of different means. One such means, that was disclosed in that application, was the photogeneration of charge carriers inside the transfer medium. One application of the concept disclosed and claimed in the aforementioned patent application is in DC liquid crystal light valves.

The aforementioned copending U.S. patent application Ser. No. 796,641 filed on May 13, 1977 by Grinberg et al discloses and claims a structure wherein a CCD input register is used to accept and store the input charge and then transfer it out to activate a light display medium such as the liquid crystal. The charge packets, after their release from the control of the CCD control voltages, diffuse through a thin epitaxial layer and reach a relatively thick space charge depletion region through which they transfer under the influence of an electric field to the opposite side of the substrate. Such a structure can be used for the storage and transfer medium of a DC liquid crystal light valve.

Some of the present photoactivated liquid crystal light valves, made according to the teachings of U.S. Pat. No. 3,976,361 use a thin film of cadmium sulphide which is driven with alternating current. The photodetector acts as a light activated voltage gate. The thin film structure is designed to accept the major portion of the drive voltage when the photoconductor is unilluminated; the portion of the voltage that falls across the liquid crystal is below the threshold for activation of the liquid crystal electro-optic effect. When light falls on the photoconductor, its impedance drops, thereby switching the voltage from the photoconductor onto the liquid crystal and driving the liquid crystal into its activated state. Due to the high lateral impedance of the thin films, there is very little spread of the photogenerated signal and of its concomitant liquid crystal electro-optic effect. As a result, the light activation process is a high resolution process, so that the device can accept photographic quality images for transfer to an intense beam of light.

The inventions disclosed and claimed in the aforementioned patent applications and patents represent truly significant advances in this art as explained in detail in said application. Our present invention extends the developments in this area of technology and has many further advantages and flexibilities. For example, high yield and compatibility with existing conventional processes, a fast photoelectric transient response, a wide range of photosensitivity and permits an AC operation over a wide frequency range which provides a greatly increased liquid crystal electrochemical stability.

THE INVENTION

The general purpose of this invention is to provide an alternating current liquid crystal light valve with an improved charge readout structure. More specifically, it involves the use of a single crystal high resistivity silicon substrate which is photosensitive under AC excitation to generate charge and then transfer it under the influence of an AC electric field across the silicon substrate which is depleted of its mobile charge carriers during one portion of the bias cycle.

To accomplish this purpose, we have provided an alternating current driven liquid crystal light valve utilizing a liquid crystal layer, an improved charge readout structure, and a means for optically isolating the improved readout structure from the liquid crystal layer. The improvement comprises a semiconductor substrate of predetermined thickness and conductivity so that under appropriate biasing conditions this substrate can be depleted of mobile charge carriers forming a space charge depletion region throughout the thickness of the substrate. The improvement further comprises means for applying an alternating current bias across this substrate and means for depleting the substrate of its mobile charge carriers during a portion of the alternating current cycle.

The semiconductor substrate can be silicon with a high resistivity so that it can be depleted of its mobile charge carriers with a relatively low voltage. The means for depleting the silicon substrate of its mobile charge carriers during a part of the bias cycle is an MOS capacitor formed on a surface of the substrate adjacent the liquid crystal interface layers. The transverse and spatially uniform electric field of the totally depleted MOS capacitor is used to collect photogenerated minority carriers and to provide a spatial resolution by means of field focusing during the depletion phase of the applied AC voltage.

One advantage of the present invention is that it uses a depleted semiconductor substrate to move a signal representing charge carriers to a liquid crystal or some other light modulated display medium. Inside the charge depleted substrate, the charge carriers are field guided and, therefore, move while maintaining their spatial resolution.

Another advantage of the present invention is that the light valve is AC driven which results in an improved electrochemical stability for the liquid crystal.

Accordingly, it is an object of the present invention to provide an AC liquid crystal light valve with an improved charge readout structure for the generation and transfer of signal representing charge carriers to a liquid crystal.

It is another object of the present invention to provide an AC liquid crystal light valve which includes a charge transfer medium that can be used to transfer many signals at high frequencies while maintaining their spatial resolution.

It is yet another object of the present invention to provide an AC liquid crystal light valve with a wide spectral range of photosensitivity.

These and other objects of the invention will become more fully apparent in the following description of the accompanying drawings.

BRIEF DESCRIPTION OF THE DRAWINGS

FIG. 2 is an equivalent circuit for the light valve structure of FIG. 1.

FIGS. 3a–3d are theoretical voltage current and light waveforms for the device depicted in FIG. 1.

DETAILED DESCRIPTION OF THE DRAWINGS

Figure 1:
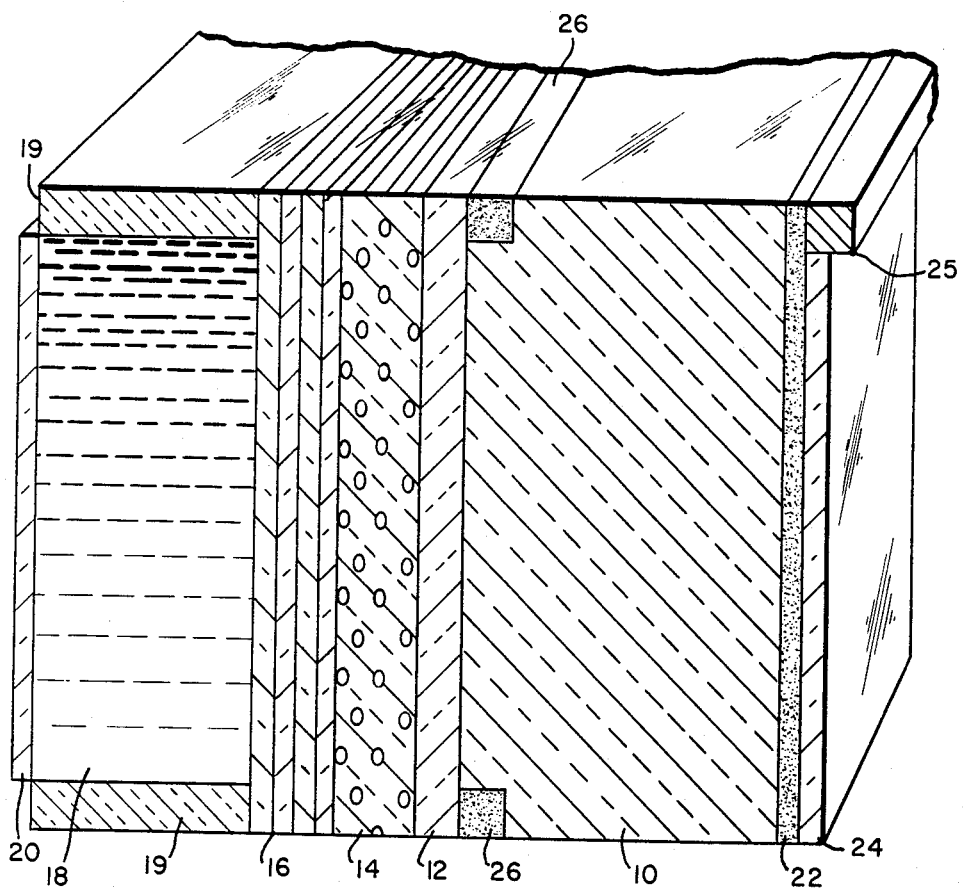
FIG. 1 is a diagrammatic cross-sectional view of an MOS AC silicon liquid crystal light valve structure constructed in accordance with the present invention.

Referring now to FIG. 1, there is shown a diagrammatic cross-sectional view of a liquid crystal light valve constructed in accordance with the present invention. It includes a high resistivity silicon substrate 10 on a surface of which there is an $SiO_2$ gate insulator 12 followed by a light blocking layer 14, a dielectric mirror 16, a liquid crystal 18 and a transparent counterelectrode 20. On the opposite side of substrate 10, there is a thin electrode 22, an $SiO_2$ passivating layer 24, and an aluminum contact pad 25. The silicon substrate 10 of the device illustrated in FIG. 1 is p type with a typical resistivity higher than 1 KΩ-cm. A high resistivity p semiconductor body is often designated with the symbol $\pi$ while a high resistivity n material is often designated with the symbol $\nu$. Although a $\pi$ material is used for the illustration of FIG. 1, the invention can be practiced equally well with a $\nu$ type material except that the voltage and current polarities will have to be reversed. The structure 10 may have a thickness on the order of 3–10 mil. and should be chemomechanically polished on both sides to provide parallel, optically flat surfaces on each side of the substrate. On the substrate side, close to the $SiO_2$ layer, there are isolation channel stops 26 to isolate the active $\pi$ region from the deleterious effects of minority carrier generation at the outside surfaces of the substrate and from the inversion charge typically present at $SiO_2$ interfaces on p-type silicon. These channel stops are p+ regions, for a $\pi$ type substrate and they are formed by the heavy doping of predetermined regions of the substrate with a p-type impurity using a gaseous diffusion or ion implantation. The thin contact electrode 22 is formed on the silicon substrate through heavy doping and it is p+ for a $\pi$ type substrate. The purpose of this layer is to provide a uniform ohmic contact to the back of the substrate so that the electric potential of the entire back surface of the substrate and at points inside the substrate can be raised or lowered in accordance with the applied bias voltage. However, this layer must be transparent to light so that photons can pass without being appreciably absorbed. To meet this requirement, it is necessary to make the layer optically thin, which means that its thickness must be less than 1/absorption coefficient for photon wavelengths within the spectral range of $0.4 \leq \lambda \leq 1.0$ μm. In addition, in order that this layer provides a uniform electrical contact, it is preferable that it be degeneratively doped. The passivating layer 24 is typically a thin $SiO_2$ layer to protect the surface of the silicon substrate. On the opposite side of the substrate 10, there is a gate dielectric layer 12 which is typically an $SiO_2$ layer. This $SiO_2$ layer is the dielectric layer of an MOS capacitor formed on substrate 10. Adjacent this gate dielectric layer 12, there is a cermet light blocking layer 14 that is used in this light valve to absorb any projection light that may be transmitted due to the finite reflectivity of the dielectric mirror 16. In CdS light valves, there is a CdTe layer to provide the same function that cermet layer 14 provides for the light valve of FIG. 1. However, CdTe is inadequate for the light valve of FIG. 1 because it absorbs light with a wavelength of less than 0.85 μm, while the silicon substrate remains photosensitive to approximately 1.1 μm which is in the near infrared region of the optical spectrum. Cermet layer 14 consists of a stack of alternating metallic particles (such as, for example, Sn, In, Pb) and dielectric layers (such as, for example, Al$_2$O$_3$). The metallic particles when deposited in relatively thin films, will coagulate into a dense array of small metal islands which are electrically noncontinuous but they still retain their metallic optical properties at the wavelengths of visible light. The use of alternating layers of this metal drops separated by an insulator reduces even further the electrical conduction in the plane of a given film and permits the capacitive coupling of charge between the metal islands of adjacent films. If the spacing between these metallic islands is relatively large in comparison to the thickness of the insulating films, then the impedance (both DC and AC) for inplane charge transfer will be much greater than that between planes thereby producing an anisotropically conductive media with the optical properties of a metal. When many alternating films are incorporated into a single layer, the opacity of the combined films is further enhanced by the multiple light scatterings from the many randomly situated metal islands. Since the islands are metallic and absorb light by the excitation of free electrons, this cermet layer is intended to provide low optical transmissivity over a wider spectral range than that achievable with semi-insulators (e.g. CdTe) since the latter are limited by the width of their forbidding band gap. Such cermet light blocking layers have been described and claimed in U.S. Pat. No. 4,093,357 entitled "Cermet Interface for Electro-Optical Devices" by Jan Grinberg et al and assigned to the present assignee. The layers described in that copending application can be adopted for use in either DC light valves or AC light valves. Since the device of FIG. 1 of the present application is designed for use with alternating current, it is not necessary that the cermet layer has a low DC conductivity perpendicular to the layer plane.

Layer 16 is a dielectric mirror such as a TiO$_2$/SiO$_2$ mirror. Region 18 is a liquid crystal electro-optic layer and regions 19 are dielectric spacers, typically SiO$_2$, for the support of the liquid crystal. Counter electrode 20 is transparent to light and adjacent the liquid crystal layer 18.

In FIG. 2, there is shown an equivalent circuit for the structure shown in FIG. 1. The silicon substrate 10 is represented by two current sources 30 and 32 for the thermal generation of current I$_d$ and the optical generation of current Iλ (due to the incoming light) respectively. It also includes a resistor 34 for the undepleted substrate resistance. I$_A$ represents the current in the substrate during the accumulation mode. Capacitor 36 represents the depletion capacitance (C$_D$) of the substrate and given by:

$$C_D = \epsilon_{Si}/X_D.$$

where $\epsilon_{Si}$ is the dielectric constant of silicon and $X_D$ represents the depleted thickness of the substrate. Switch 38 indicates the switching on/off of the incoming light. The diodes 41, 42 and 43 are there to indicate the interruption of the different current flows during the time that certain mechanisms are interrupted. Thus, these diodes possess ideal characteristics. Capacitor 44 represents the capacitance (C$_{OX}$) of the MOS capacitor formed by the gate dielectric on the silicon substrate. Its value is given by:

$$C_{OX} = \epsilon_{OX}/d_{OX}$$

where $\epsilon_{OX}$ is the dielectric constant of the gate dielectric and $d_{OX}$ is the thickness of this dielectric layer (SiO$_2$). Capacitor 46 (C$_{DM}$) represents the combined capacitance of the interface layers 14 and 16 (of FIG. 1), namely the dielectric mirror and the light blocking layer. I$_g$ is the current through the liquid crystal. The liquid crystal layer 18 is represented by an RC network 48 having a capacitor 50 (C$_{LC}$) and a resistor 52 (R$_{LC}$). A voltage source 53 provides the external bias to the circuit.

In FIGS. 3a through 3d, there are shown current, voltage, and input light waveforms for the device depicted in FIGS. 1 and 2. In FIG. 3a, there is shown the waveform of the applied voltage across the MOS substrate (10 and 12) through the liquid crystal and dielectric mirror/cermet light blocking layer capacitances. The pulse widths are selected to satisfy the condition $T_A << T_{LC}(=R_C C_{LC}) << T_D$ wherein $T_A$ represents the time for the accumulation phase and $T_D$ represents the time for the depletion phase. The voltage amplitude of the depletion phase $V_D$ is selected sufficiently large so that the substrate is fully depleted of all mobile charge carriers from the Si/SiO$_2$ interface (between regions 10 and 12) up to and partially into the p+ contact electrode (region 20) for the entire pulse width $T_D$. Since the p+ contact electrode is very heavily doped, the charge depletion region penetrates only slightly into this region and thus the total capacitance of the Si substrate is given by:

$$C_D = \epsilon_{Si}/(X_{D\pi} + X_{DP}) \approx \epsilon_{Si}/X_{D\pi}.$$

wherein
  $X_{D\pi}$ = total $\pi$ region thickness
  $X_{DP}$ = thickness of the depleted p+ region.
If the thicknesses of the various layers in the Si MOS light valve are chosen to satisfy the following relationship $$X_{D\pi} >> X_{LC} >> X_{OX} + X_{DM} > X_{DP}$$

(wherein $X_{LC}$ = thickness of the liquid crystal, region 18, $X_{OX}$ = thickness of the gate dielectric, region 12, $X_{DM}$ = thickness of the mirror plus thickness of the light blocking layers, regions 14+16) then the respective capacitances/unit area of the various layers will satisfy the inverse relationship, [(C$_{OX}$, C$_{DM}$) >> C$_{LC}$ >> C$_D$] and thus at the outset of the depletion pulse, essentially all the voltage is applied across the silicon $\pi$. The polarity of this voltage is such as to repel the majority charge carriers, which for the structure with a $\pi$ substrate are holes, out of the substrate and into the external circuit through the back contact electrode and to set up a spatially uniform electric field that is directed perpendicular to the plane of the substrate. The magnitude of this electric field is constant throughout the $\pi$ region and decreases to zero at the extremity of the depleted portion of the p+ back contact electrode. Minority charge carriers which in this case are electrons and which are generated in or within a diffusion length of this wide depletion region, will be collected by the electric field and accelerated to the Si/SiO$_2$ interface where they will be stored and immobilized by surface states and oxide traps. The density of both surface states and oxide traps can be controlled by suitable addition of impurities and alteration of the processing conditions during the gate oxidation to increase the immobile charge storage capacity at this interface.

Minority carrier generation occurs by defect related thermal processes present throughout the volume of the depletion region and by optical absorption of photons with energies equal to or greater than the band gap of silicon, 1.12 eV. The latter process is localized by the spatial extent of the input light image which will be preserved by the orthogonal interaction with the depletion region electric field and the discrete nature of the interface traps.

The most severe limitation to the achievable resolution of these types of devices results from minority charge carriers spreading at the Si/SiO$_2$ interface due to the ordinary electrostatic repulsion of like charges on an equipotential surface. In the simplest approximation, all points within the $\pi$ region at the plane of the Si/SiO$_2$ interface are at the same potential with respect to the p+ back contact during the depletion phase of the applied voltage cycle. In the absence of traps, minority carriers which are collected at the interface, are free to move laterally within this plane in order to minimize the electrostatic interaction and subsequently reduce the spatial resolution of the optically generated charge. At a real MOS interface, there can be rather large spatial fluctuations in surface potential introduced by the random distribution of oxide charge, ionic impurities in both the SiO and/or SiO$_2$, and permanently charge slow oxide traps. If sufficiently large, these potential variations across the plane of the interface will tend to confine the collected signal charge to localized regions, of minimum surface potential. In addition to this, some of the fast interface states, which are normally present (and which can be intentionally introduced) at the interface, are capable of trapping and detrapping minority charge in time periods that are short compared to the accumulation pulse width, $T_A$. These states are presently believed to be localized in space and thus, if a photoelectron is trapped at the Si/SiO$_2$ surface, it will remain there until it recombines with a majority carrier hole during the accumulation phase of the applied bias cycle. Thus, the real silicon MOS capacitor incorporates two possible mechanisms that can reduce the repulsive spread of signal charge and thereby preserve the spatial resolution of the input optical image.

Referring now to FIGS. 3a and 3b, at time $t_o$ with no input illumination the applied bias voltage ($V_{gs}$) is switched suddenly from the accumulation voltage $V_A$ ($=0$) to the positive depletion voltage $V_D$. If the transition time (for $V_A \to V_D$) is much less than the RC time constant of the liquid crystal layer $\tau_{LC}$ ($=\rho_{LC}\epsilon_{LC}\epsilon_o$), the applied voltage will then be capacitively coupled through the liquid crystal layer. If the impedance of the MOS capacitor is much smaller than that of the liquid crystal, then a major portion of the applied depletion bias ($\simeq C_{LC}V_D/(C_{LC}+C_D)$) will be dropped initially across the silicon substrate to establish the depletion region which in turn results in only a small voltage drop across the liquid crystal $\sim C_D V_D/(C_{LC}+C_D)$ at the time $t=t_o$. The thermal charge generation will proceed throughout the depleted volume of silicon, and this process will result in current of minority carriers with a magnitude given by $$I_d = (qn_i^2/2\tau_g)L_D (\text{amps/cm}^2)$$

Where
 $n_i$ = intrinsic carrier density
 $\tau_g$ = generation lifetime which is inversely proportional to the generation rate.
 q = electron charge This dark generation current remains essentially constant throughout the whole depletion phase of each cycle to a first approximation, and its direction is such as to reduce the voltage drop across the depletion capacitance, $C_D$. For times to $+3\tau_{LC} < t < t_o + T_D$, the increased minority charge at the interface results in an increased voltage drop across $C_{LC}(C_{OX}+C_{DM})$ that is charged through the liquid crystal resistance ($R_{LC}$). During this process, the liquid crystal is subject to the nearly constant potential difference, $I_d R_{LC}$.

When the applied bias is switched rapidly from depletion to accumulation, a surge majority carrier charge flows through the branch containing diode 43 (in FIG. 2) which is sufficient to collapse the space charge region and recombine all of the minority charge residing at the Si/SiO$_2$ interface. If the recombination process is completed within the time $T_A$ and if $T_A << \tau_{LC}$, the voltage dropped across the liquid crystal during $T_A$ will be given by $$V^d_{LC}(T_A) \simeq Q'_D + Q_d/C_{LC}$$

Where $Q'_D = qN_A(\pi)L_D'$ = depletion region space charge at $t_o + T_D$ and $Q_d = I_d T_D$ = integrated dark current.

For a highly asymmetrical input bias waveform (i.e., $T_A << T_D$), it can be shown that the rms value of the total voltage across the liquid crystal layer is determined by the term $I_d R_{LC}$, since the dielectric relaxation characteristic of this layer essentially filters out the high frequency transient components of the voltage introduced during the accumulation phase.

This light value utilizes the electro-optic properties of nematic liquid crystals in either the 45° twisted-nematic or the birefringent color-switching mode configurations to achieve optical modulation of the projected output light beam. Both of these phenomena manifest a voltage threshold $V_T$, below which the molecules of this layer retain their initial alignment parallel or perpendicular with respect to the electrode surfaces. If the rms voltage across the liquid crystal exceeds $V_T$, then the molecules will reorient to an extent determined by the magnitude of the dielectric anisotropy for the particular liquid crystal used and the magnitude of the excess voltage ($V_{LC} - V_T$). This effect induces an optical birefringence which can easily be used to retard the phase of a polarized light beam and thereby produce a color/intensity modulation in proportion to ($V_{LC} - V_T$).

When photons from the input image are absorbed at a near the p+ back contact during the depletion time $T_D$, an additional flux of minority carriers is generated which adds to the current generated thermally or seen in FIG. 3c. The magnitude of the photocurrent is given by $$I_\lambda = aF_\lambda \eta$$

where $F_\lambda$ = total absorbed photon flux due to the light of the input image.

$\eta$ = overall quantum efficiency including the effects of surface reflection and recombination. In a manner similar to that described for the thermally generated dark current, transport of this charge to the Si/SiO$_2$ interface results in an additional voltage ($I_\lambda R_{LC}$) across the liquid crystal film such that now the total LC voltage is given by $$V_{LC}^\lambda(T_D) = (I_d = I_\lambda)R_{LC}.$$

Likewise, during the short accumulation pulse, the liquid crystal voltage is nearly constant and given by $$V_{LC}^\lambda(T_A) \approx (Q_d'' + Q_d + Q_\lambda)/C_{LC}.$$

Where
$Q_\lambda = qF_\lambda \eta T_D$ $Q_d''$ = depletion region space charge at $t_o + T_D$ with the light on.

The present analysis has been directed towards the situation in which the depletion time $T_D$ of the applied voltage waveform has chosen to be much greater than the RC time constant of the liquid crystal load ($\tau_{LC} = \rho_{LC}\epsilon_{LC}$). This restriction was only used for the purpose of illustration and in no way implies a frequency limitation on the overall operation of this device. At higher pulse repetition frequencies such that $T_D \lesssim \tau_{LC}$, the physical processes occuring within this device are siliar to those described above. The main difference with high frequencies is the increased level of transient AC current through the liquid crystal which will tend to reduce the attainable photosensitivity for a given input light intensity.

From the above description and from the waveform shown in FIG. 3d, it is apparent that the rms voltage across the liquid crystal in the presence of absorbed radiation at the back surface is greater than under conditions of no input illumination. If the thermal generation rate is sufficiently low, then the applied asymmetrical pulse amplitude may be chosen to satisfy the condition that $V_{LC}^d(\text{rms}) < V_T$. With an input image of sufficient intensity, the liquid crystal voltage in the corresponding areas will be such that $V_{LC}^\lambda(\text{rms}) > V_T$, and under these conditions, the liquid crystal will locally reorient to produce the required output image.

In a test device of a silicon MOS light valve, a p-type silicon substrate with a resistivity of approximately 40 KΩ-cm, and a thickness of approximately 15 mm was used. An SiO₂ layer of 1000 Å was formed on a surface of the substrate through thermal oxidation for the gate dielectric, a p+ back contact was formed using a boron diffusion step. Since a He-Ne layer beam was used to project the light valve output, a red-tuned, seven pair (SiO₂/TiO₂) dielectric mirror was used to optically isolate the silicon substrate from the readout beam eliminating the need for a separate light blocking layer. A liquid crystal was aligned perpendicular to an electrode surface and then it was assembled with the remaining part of the light valve cell. This device manifested both photosensitivity and good spatial resolution using green input light at intensities approximately 300 μW/cm² and various input voltage waveforms with frequencies between 100 KHZ and 5 MHZ.

What is claimed is:

1. An alternating current liquid crystal light valve, comprising:
   (a) a silicon substrate;
   (b) a silicon dioxide layer formed on a surface of said substrate;
   (c) light blocking means adjacent said silicon dioxide layer;
   (d) light reflecting means adjacent said light blocking means;
   (e) a liquid crystal layer adjacent said light reflecting means; and
   (f) alternating current biasing means whereby during a part of the alternating current cycle, the voltage across the silicon substrate-silicon dioxide structure depletes said silicon substrate of its mobile charge carriers and permits charges to move from one side of the substrate to the opposite side adjacent said silicon dioxide under the influence of the electric field set up by said biasing means.

2. A liquid crystal light valve adapted to be driven by a bias voltage alternating between two preselected levels and having a charge readout structure, a liquid crystal layer, means for optically isolating said charge readout structure from said liquid crystal layer and electrode means for applying said bias voltage across said light valve wherein the improvement comprises said charge readout structure having a dielectric layer adjacent said optically isolating means and a semiconductor substrate adjacent said dielectric layer, said substrate being of a predetermined thickness and conductivity, such that when said bias voltage is at one of said preselected levels it causes said semiconductor substrate to be depleted of its mobile charge carriers whereby a charge depleted region and an electric field are established in said region through which signal representing charge carriers move across said substrate towards said dielectric layer under the influence of said field.

3. A liquid crystal light valve as set forth in claim 2, wherein:
   a. said semiconductor substrate is silicon; and
   b. said dielectric layer is silicon dioxide.

4. A liquid crystal light valve as set forth in claim 2, wherein said means for optically isolating said charge readout structure from said liquid crystal layer comprises:
   a. a cermet light blocking layer adjacent said dielectric layer; and
   b. a dielectric mirror structure adjacent said cermet light blocking layer.

5. A liquid crystal light valve adapted to be driven by a bias voltage of a predetermined amplitude, frequency and duty cycle, said light valve having a liquid crystal layer, a charge readout structure, interface means adjacent said charge readout structure for optically isolating said charge readout structure from said liquid crystal layer, and an associated electrode arrangement adapted for receiving said bias voltage and responding thereto so that signal representing charge carriers in said charge readout structure will result in the application of electrical signals across said liquid crystal layer, characterized in that said charge readout structure comprises a dielectric layer adjacent said interface means and a semiconductor substrate of a predetermined thickness and conductivity adjacent said dielectric layer forming a substrate-dielectric layer interface so that during a portion of said duty cycle said bias voltage causes said semiconductor substrate to be depleted of its mobile charge carriers establishing a charge depletion region and an electric field in said region through which signal representing charge carriers move under the influence of said electric field, while maintaining their spatial resolution to reach said semiconductor-dielectric layer interface and apply activating electrical signals across said liquid crystal layer.

* * * * *